May 18, 1965  L. E. RUSSELL  3,183,875
BUMPER
Filed Dec. 9, 1963

INVENTOR.
LINUS E. RUSSELL
BY Tom Walker
Jerome P. Bloom
ATTORNEYS

United States Patent Office 3,183,875
Patented May 18, 1965

3,183,875
BUMPER
Linus E. Russell, Springfield, Ohio, assignor to Peters & Russell, Inc., Springfield, Ohio, a corporation of Ohio
Filed Dec. 9, 1963, Ser. No. 329,038
2 Claims. (Cl. 114—219)

This invention relates to a bumper structure which is particularly advantageous for use on small boats and will be so described. Embodiments have a flexibility of application and an improved form enabling a greater degree of protection for a boat gunnel than normally available in the use of a conventionally formed bumper.

A primary object of the invention is to provide a boat bumper which is economical to fabricate, more efficient and satisfactory in use, adaptable to a wide variety of applications and unlikely to malfunction.

A further object of the invention is to provide a structure which is particularly advantageous for use as a bumper on a small boat.

Another object of the invention is to provide a boat bumper having a form enabling maximum protection for a boat gunnel.

An additional object of the invention is to provide an improved bumper the form of which enables its application to stand above a boat gunnel and offer maximum protection to the gunnel strip.

Another object of the invention is to provide a hollow resilient bumper structure having a form facilitating its secure application under the lip of a boat gunnel or the like.

A further object of the invention is to provide a bumper possessing the advantageous structural features, the inherent meritorious characteristics and the means and mode of operation herein described.

With the above and other incidental objects in view as will more fully appear in the specification, the invention intended to be protected by Letters Patent consists of the features of construction, the parts and combinations thereof and the mode of operation as hereinafter described or illustrated in the accompanying drawings, or their equivalents.

Referring to the accompanying drawing wherein is shown one but obviously not necessarily the only form of embodiment of the invention, FIG. 1 is a perspective view of a bumper constituting an embodiment of the present invention;

Like parts are indicated by similar characters of reference throughout the several views.

Figure 1:
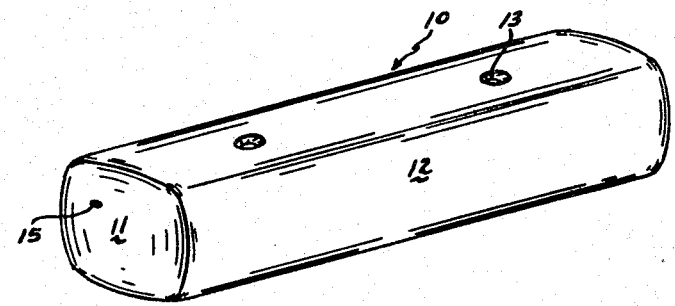
Figure 2:
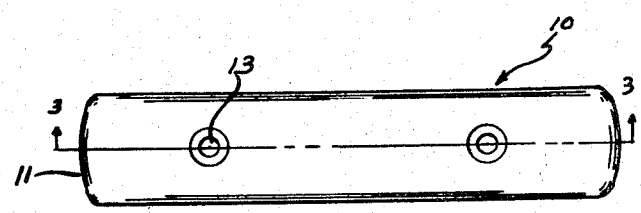
FIG. 2 is a top view of the bumper as shown in FIG. 1.
Figure 3:
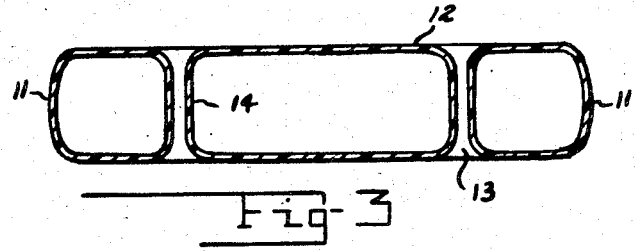
FIG. 3 is a longitudinal cross-sectional view of the bumper of FIG. 1.

The bumper 10 which is shown in the drawings to illustrate the present invention has an oblong generally rectangular shape. It is hollow and molded to an integral form to include generally square end walls 11 and, integrally connecting therebetween, four rectangularly arranged side walls 12.

The bumper walls are resilient and preferably formed of a plastic material. The rectangularity of their disposition is modified by providing that their respectively interconnected edges and corners have a slightly rounded contour.

As may be obvious from the drawings, bumper 10 is provided with a pair of through passages 13, one adjacent each end. Each of the passages 13 is defined by a tubular bumper section 14 which extends between and orients perpendicular to opposite side walls 12. The sections 14 are formed to have a much lesser degree of resilience than the bumper walls and their respective ends which resiliently connect with side walls 12 are so formed to provide an outward flare to the respective extremities of the passages 13.

The tubular sections 14 transversely bridge the hollow bumper structure, are similarly spaced from its respective ends and transversely centered. Having a lesser degree of resilience than the bumper walls and having a balanced position in reference thereto, the sections 14 tend to exert a reinforcing influence thereon.

Included in one end wall 11 is a needle-type inflating valve 15 by means of which the hollow bumper unit may be pneumatically inflated in a conventional manner. Inflation of the bumper provides a predetermined cushion of air about each section 14 which offers a buffer between these sections and the bumper walls.

It may thus be seen that the reinforcement of the bumper walls by the tubular sections 14 having less resilience than the walls and the inclusion within the bumper and about the sections 14 of air under a predetermined pressure achieves a bumper capable of substantial protecting influence. The bumper is light in weight yet capable of absorbing a high degree of impact without damage thereto or the structure over which it lies.

The form of the invention bumper also facilitates its application and disposition in reference to small boats so as to lend a greater degree of protection thereto.

Figure 4:
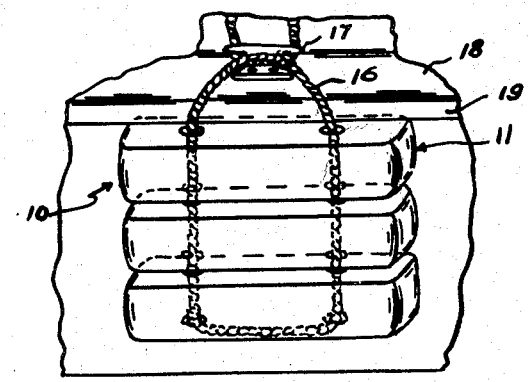
FIG. 4 illustrates one application of the bumper of FIG. 1 to a small boat.

As mentioned previously, the described embodiment is particularly advantageous in application to the protection of a boat gunnel. One such application is illustrated in FIG. 4 of the drawings. In this instance, we see a plurality of the described bumper structures horizontally oriented and vertically stacked to align their through passages 13. These bumpers are suspended through the medium of a single line 16. As shown, the line passes from a cleat 17 on a boat deck 18 over the lip of a gunnel 19 to pass through the vertically aligned through passages 13 to the one end of the bumpers 10. It exits through the lowermost bumper to pass thereunder and thread upwardly through the vertically aligned through passages 13 in the other ends of the bumpers and passes back to the cleat where the line is anchored.

Whether the line be passed through a single bumper in the manner described or a plurality of bumpers as shown, the form of the invention bumpers and the arrangement of their through passages 13 enables that the bumper adjacent the gunnel strip 19 have its innermost side drawn up directly against the outer surface of the boat to dispose the innermost portion of its upper surface under the projected gunnel lip. Note that the transversely centered, vertical position of the passages 13 in this instance disposes their entrance portions immediately outward of the outer edge of the gunnel lip. This facilitates the disposition of the bumpers 10, as shown, in their most protective position in respect to the side of the boat and the gunnel strip.

Thus, the bumper elements as shown in FIG. 4 are cushioned directly against the boat side with the uppermost one engaging directly under the gunnel lip and projecting therefrom so as to offer a maximum security to the boat structure. The bumper disposed as described enables that on impact with a foreign object the reaction thereto is more widely disseminated in reference to the boat structure which it tends to hug.

Therefore, it may be seen that both the bumper form and the positioning and arrangement of the through passages 13 facilitate the optimum positioning of the bumper under a gunnel strip.

The utilization of sections 14, positioned as described, which are less resilient than the bumper walls not only provides a reinforcement of the bumper structure per se but offer security to the line which threads therethrough. On high impact the line is better protected and its disposition is such that it has optimum resistance to breakage.

Figure 5:
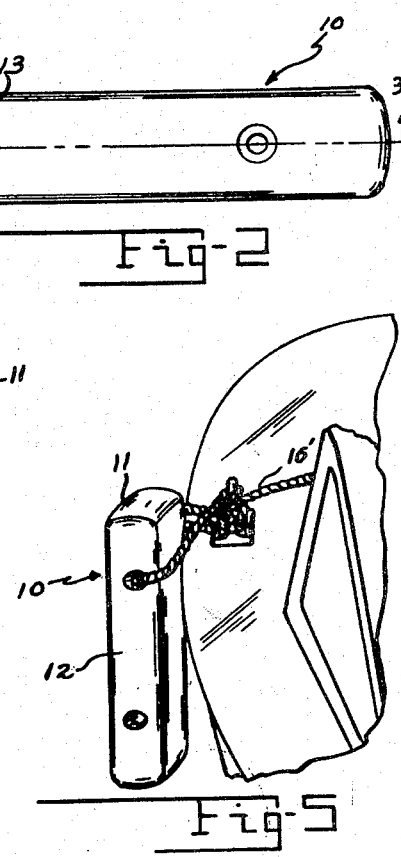
FIG. 5 illustrates another application of the bumper to a boat.

The versatility of the described bumper is even more particularly revealed in FIG. 5 of the drawings. Here, rather than horizontally, the bumper is disposed in a vertical sense. A single line 16′ anchored to a cleat on a boat deck extends transversely of the bumper through one of the passages 13 and back to the cleat. In this instance, the bumper section 14 accommodating the line 16′ orients generally co-planar with the boat deck to cause the most adjacent end of the bumper to stand above the boat gunnel. It may therefore be seen that the invention bumper offers a flexibility of application and a degree of protection for a boat gunnel which is above and beyond that normally contemplated in the use of a conventional bumper.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A marine type bumper, including a hollow body, comprising an integrally formed continuous wall of a resilient material, said wall being generally square-like in cross section, having opposing end walls, side walls and top and bottom walls, and means for suspending said bumper to take impacts on its side walls, said means including at least one core section interconnecting said top and bottom walls and opening therethrough, said section being made of a resilient material like said walls and joining unitarily at its ends to said top and bottom walls and defining a through line passing opening, said section being located and having a breadth to be spaced from side and end walls of said body, said body having a plurality of said core sections, one near but spaced from each end wall of said body, said body being adapted to be suspended alternatively in the bight of a line passed through the openings in both said core sections or from a line passed through the opening in only one of said core sections, said body in the former instance being adapted to be brought up adjacent to the underside of the gunwhale with its side walls horizontally disposed relative to the boat axis and in the latter instance to be suspended vertically with one end projecting upward above the plane of the gunwhale.

2. A marine bumper for a boat providing a cleat at deck level, including a hollow elongate body formed multiple sided to inhibit rolling about its longitudinal axis, said body being made of a continuous wall of relatively soft, resilient material and having a core section in transverse relation to the longitudinal axis of said body, said core section being made of a material like the material of said wall and joining unitarily to opposing sides of said wall, said core section being open throughout its length and opening through said opposing side walls to define a transverse line passing opening through the body, and said core section further being located in such spaced relation to one end of said body whereby a line passed through said core section and made fast to a cleat on the boat deck may draw said body up to the side of the boat to hang in a longitudinal suspended position with said one end thereof projecting through and substantially above the plane of the boat deck.

References Cited by the Examiner

UNITED STATES PATENTS

| | | | |
|---|---|---|---|
| 2,903,990 | 9/59 | Brown | 114—219 |
| 2,940,414 | 6/60 | Moore | 114—219 |
| 2,965,407 | 12/60 | Meisen | 114—219 |
| 3,026,548 | 3/62 | Dollinger | 114—219 |

FOREIGN PATENTS 653,011 11/62 Canada.

FERGUS S. MIDDLETON, *Primary Examiner.*